3,418,144
REFRACTORY METAL COATING
John D. Culp, Ferguson, and Thaddeus C. Grimm, Kirkwood, Mo., and Thomas H. Fitzpatrick, College Park, Ga., and Ralph D. Patterson, St. Louis, Mo., assignors to McDonnell-Douglas Corporation, St. Louis, Mo., a corporation of Maryland
No Drawing. Filed Nov. 12, 1964, Ser. No. 410,725
5 Claims. (Cl. 106—14)

ABSTRACT OF THE DISCLOSURE

A coating process and composition for diffusion reaction with a refractory metal structure which can be painted onto the surface. The composition comprises silicon metal, sodium fluoride activator in the ratio of one part activator to 6.3 to 19 parts silicon, and aqueous carrier containing 0.3–1% methyl cellulose binder.

---

This invention relates to refractory metal coating and process for the protection against corrosion and oxidation, and more specifically the invention relates to a refractory metal slurry coating process to produce an environmental resistive coating particularly oxidation of such refractory metal.

Because of the advancing technology in the field of aerospace industry where high speed aircraft and spacecraft encounter hypersonic flight conditions, the refractory metal alloys, in particular tungsten, tantalum, columbium and molybdenum, are being used for structural materials since such meet many of the essential requirements of structural materials for withstanding operation at elevated temperatures. However, the chief difficulty in the utilization of refractory metals is the lack of resistance to oxidation particularly in high temperature, atmospheric exposure. The major problem with oxidation of refractory metals is the conversion from the base metal to the oxide thereof which is a non-protective oxide, and therefore, the refractory metals rapidly lose their useful structural properties under such oxidation conditions.

Various techniques have been utilized in attempts to provide refractory metals with appropriate surface coatings to avoid the loss of structural strength under high temperature oxidation conditions. Vapor deposition processes to convert the refractory metal surfaces to a protective surface against high temperature oxidation, as well as the pack cementation technique wherein the part or component to be protected is embedded in a material which is capable of reacting under appropriate conditions with the refractory metal to produce a surface protection coating against high temperature oxidation. While successful, these processes are subject to severe limitation in the type and characteristic of the refractory metal structural components to be treated. Further, these processes require coating of parts and then coating assemblies of coated parts.

The present invention avoids many and eliminates substantial problems by providing a slurry of material in which the refractory metal structure member may be immersed or brush coated or spray coated or applied in similar manners, and thereafter subjected to appropriate environment to cause a reaction between the protective constituent of the slurry and the refractory metal being protected. In accordance with the invention complete parts or assemblies may receive a single coat treatment or although not essential, parts may be initially treated and converted to the protective surface coating by the slurry process and thereafter be assembled in a completed structure and retreated as an extra step to aid complete protection of joints, blind recesses, etc. from environmental oxidation. Also, the complete parts or assemblies may be pretreated with tungsten slurry as hereafter noted.

Therefore, it is an object of the invention to provide a refractory metal coating process in which the assembly to be coated is dipped in a slurry of silicon and thereafter exposed to high temperature curing to cause a reaction with the formation of a refractory metal-silicide.

It is another object of the invention to provide a refractory metal silicon coating process in which a slurry is applied to a refractory metal part and thereafter expose to an inert high temperature diffusion environment to produce a refractory metal silicide coating for such part.

It is another object of the invention to provide a silicon slurry coating process for molybdenum in which a molybdenum part is immersed in a silicon slurry of about 45 percent silicon metal powder, 5 percent sodium fluoride and a 50 percent by weight of .6 percent methyl cellulose water solution, after which the part is air dried at about 120° F. and thereafter exposed to an inert environment in a furnace maintained at about 1900° F. to produce a molybdenum disilicide surface on the molybdenum parts.

Another object of the invention is to provide a slurry coating material comprised of a silicon coating former to activator in a ratio between 1:19 and 1:6.3, a solid to carrier in a ratio between 1:1 and 2:3 with a binder percentage of carrier between 0.3 percent and 1.0 percent which may be applied by dipping or brushing in sufficient thickness to provide a uniform surface coating on a refractory material to be protected.

Another object of the invention is to provide a slurry coating material comprised of a coating former of silicon to activator in a ratio between 1:19 and 1:6.3, a total solid to carrier in a ratio between 1:1 and 2:3 with a binder percentage of carrier between 0.3 percent and 1.0 percent which material may be applied by dipping or brushing in sufficient thickness to provide a uniform surface coating on a refractory material to be protected, which may be modified with metal additives of chromium, columbium, tantalum or tungsten in an amount of about 2 to 4 percent by weight of the silicon metal powder.

It is a further object of the invention to precoat a molybdenum substrate with a layer of tungsten prior to the application of the silicon powdered metal slurry coating former in which the tungsten is applied from a water based slurry of the tungsten metal powder and 10 percent by weight sodium fluoride.

A still further object of the invention is to provide a coating process for refractory metals in which the metal is dipped in a water base slurry of the protective coating former, air dried at a moderate temperature to eliminate the water, heat treated in an inert atmosphere maintained at a temperature suitable for diffusion for a period of time sufficient to permit formulation of the protective refractory metal surface.

These and other objects and advantages will become more apparent from the following detailed description of the slurry coating material and process for protecting refractory metal surfaces and particularly molybdenum.

In particular, the present invention is concerned chiefly with providing a refractory metal-silicon system which avoids environmental oxidation of the refractory metal. Although the invention appertains to all refractory metals, for simplicity the molybdenum-silicon system will be used in describing the process and coating. The molybdenum-silicon system comprises the phases $Mo_3Si$, $Mo_5Si$, $Mo\bar{S}i_2$, $MoSi_2$ in addition to the powdered silicon metal that forms the basis of the molybdenum protection system.

One of the anomalies of molybdenum is the catastrophic oxidation of pure molybdenum, whereas molybdenum disilicide is one of the most oxidation resistant materials known. Therefore, the final coating formulation of most siliconizing processes is a molybdenum disilicide. Oxidation of the molybdenum disilicide occurs by the movement of silicon atoms outward to the surface resulting in the formulation of an outside silicon dioxide glassy layer that provides the main mode of high temperature protection and gives a self-healing property to the coating.

The coating system appertaining to the invention is a water base slurry which is adaptable to dipping or brushing techniques for application to molybdenum parts and assemblies. Essentially the coating system consists of three basic constituents. A coating former, for example, silicon metal powder, an activator, for example, sodium fluoride, and a binder such as methyl cellulose; all mixed in a slurry with the base carrier water. Although sodium fluoride is the preferred activator, the chlorides, iodides and bromides of alkali metals can also be used to provide the mass transfer medium in forming the coating.

The protective layer of the oxidation protection system is formed by a diffusion reaction between the coating former, silicon, and the molybdenum substrate. Although there may be other chemical explanations as to the precise mode in which the several reactions occur to form the molybdenum disilicide, the prevalent view suggests the following. Silicon is transported to the surface of the molybdenum by the silicon fluoride gas ($SiF_4$) which is formed by the following reactions:

$$2NaF = 2Na + F_2$$
$$2F_2 + Si = SiF_4$$

The molybdenum disilicide is then formed by the following reaction:

$$SiF_4 = Si + 2F_2$$
$$2Si + Mo = MoSi_2$$

After the initial layer of the $MoSi_2$ forms, the silicon deposited from the silicon fluoride gas diffuses toward the $MoSi_2$-Mo interface to react further with the molybdenum.

The coating slurry appertaining to the invention is based on water to eliminate the high evaporation problem and flash point hazard present in many of the complex organic solvent systems that might be used. The unreacted slurry containing a methyl cellulose binder when applied to the molybdenum exhibits sufficient unreacted coating strength to allow the parts to be handled within reason prior to the diffusion reaction. As mentioned before, the slurry includes a coating former activator, and a carrier and binder. Satisfactory coatings may be obtained using the constituents in the following range of amounts:

Activator to coating former ratio including and between 1:19 and 1:6.3
Solid to carrier ratio from 1:1 to 2:3
Binder percentage of carrier from 0.3% to 1.0%

A preferred slurry formulation is as follows:

Coating former: 45.0% by weight silicon metal powder
Activator: 5.0% by weight sodium fluoride
Carrier and binder: 50% by weight of an 0.6% methyl cellulose water solution In preparing the slurry the methyl cellulose water solution should be initially mixed and then added to a mixture of the silicon metal powder and sodium fluoride. The composition is then stirred until a homogeneous smooth stirring slurry is obtained.

Moreover, very satisfactory coatings can be obtained with modifying additives to the slurry. These modifiers may be metals such as chromium, columbium, tantalum or tungsten, and for best results should be added to the slurry in quantities of 2 to 4 percent by weight of the silicon metal powder. If the molybdenum substrate is precoated with a slurry of tungsten and then coated by the silicon slurry, the average protective life of the slurry coating will be increased. The tungsten may be applied from a water slurry of 600 mesh (Standard Screen size) tungsten metal powder and 10 percent by weight sodium fluoride. Brushing or dipping the slurry onto the molybdenum part is a satisfactory application technique. This technique will provide approximately 10 mils of uncured tungsten slurry coating thickness. Heat treating of the tungsten slurry coated part for 16 to 20 hours at 2000° F. in an inert atmosphere produces a layer of tungsten on the molybdenum surface of about 0.1 to 0.2 mil thick.

With or without the precoating of tungsten, the protective coating system for molybdenum using silicon as a coating former is preferably a single coating complete oxidation protection process for complex assemblies.

The application process of the silicon coating slurry to molybdenum parts follows.

Parts were dipped in the cold slurry of the hereinbefore noted preferable formulation of the composition and received an uncured coating of about 50 to 100 mils thick. The coating was then air dried in an oven at approximately 120° F. Parts which were undergoing the process were preferably held or suspended with tantalum wire or packed in an alumina-urea mixture. Such fixturing is preferable for accomplishing the diffusion heat treatment cycle. The parts were suspended in a heat treating furnace with a flowing argon atmosphere (which could have been a static argon atmosphere or any inert atmosphere). The heat cycle was 16 to 20 hours at a temperature of about 1900° F. after which the parts were cooled at a relatively uniform rate to room temperature and removed from the heat treatment furnace.

Very complex assemblies which have limited accessible areas may receive a special coating cycle in order to allow adequate post treatment cleaning. The uncured coating of the silicon slurry is applied to produce 10 to 15 mils coating thickness, which coating is air dried at 120° F. The assemblies are suspended in a retort with an additional amount of sodium fluoride placed in the retort at a ratio of 30 grams per cubic foot of retort volume. A static, inert atmosphere is provided within the retort and the complex assemblies are heated for 16 to 20 hours at 1900° F. Any excess residue, which should be nominal, is chemically removed with sodium hydroxide solution after the complex assemblies have been cooled and removed from the retort.

The protective coating system can be used as a single coating-single diffusion process. This advantageously allows complete assemblies to be coated after fabrication and thus eliminates the necessity for a prefabrication coating process which is employed in all of the systems. Fabrication of coated parts into assemblies is a crucial operation since the protective coating may become chipped or cracked. Consequently the workability of coated parts is much more limited than for uncoated parts made from molybdenum or other refractory metals. Naturally, the elimination of the prefabrication coating process will increase production rate, eliminate coated part waste and consequently save money.

Various parts and assemblies of both molybdenum and tungsten have been coated in accordance with the specific slurry formulation and processing steps described. Molybdenum assemblies were tested at temperatures of 3100° F. with no failure. Oxidation tests have also been conducted in the critical low temperature ranges with no failure. Oxidation check with step-up and step-down cycles at 1400° F., 2500° F. and 3000° F. have been conducted with no part failures. The tungsten assemblies were tested and found to be equally as good and perhaps better. Of course other refractory metals may be treated with the slurry appertaining to the invention.

After diffsion in the heat treatment cycle, the coating on molybdenum has a dark even color. Upon exposure to high temperature oxidizing conditions the color slightly lightens but remains with a smooth even texture. In view of the dark coloring the coating should have a favorable high emissivity both before and after it has been subjected to high temperature environments.

The silicon slurry coating material appertaining to the invention may be prepared and maintained in a large tank in which parts and assemblies may be dipped with sufficient pick-up of material to provide the final cured coating. This provides a distinct advantage over the wasteful processes such as a pack cementation where the part is packed in a large quantity of material which can be used only once, or the fluidized bed system which utilizes a gaseous halide continuously purging through a particular bulk containing the part to be coated. Furthermore, the slurry coating appertaining to the invention is a stable system which remains suspended and uniform thus avoiding tendency to settle out or become hard caked at the bottom of the container. The water base carrier avoids the hazard of highly volatile organic solvent systems.

Although the coating system and slurry appertaining to the invention have been disclosed by referring to molybdenum as the preferred refractory material, it will be appreciated that the system may be applied to columbium, tantalum and tungsten, the refractory metals previously noted. Moreover, it will be appreciated that various modifications and changes in the detail techniques will be readily appreciated by those skilled in the art. Therefore, such minor modifications and changes as will become apparent to those skilled in the art are deemed to be within the scope and spirit of the invention which is limited solely as necessitated by the scope of the appended claims.

What is claimed is:

1. A coating slurry for diffusion reaction with a refractory metal structure comprising an admixture in an aqueous solution of a coating former of particulate silicon metal, an alkali metal halide activator in the ratio of one part by weight activator to 6.3 to 19 parts by weight silicon metal and an aqueous carrier in the ratio of 1 to 1.5 parts by weight carrier to one part by weight total solids, said carrier containing from 0.3 to 1.0 percent methyl cellulose binder.

2. A coating slurry for diffusion reaction with a refractory metal structure comprising an admixture in an aqueous solution of a coating former of particulate silicon metal, a sodium fluoride as an activator in the ratio of one part by weight activator to 6.3 to 19 parts by weight silicon metal and an aqueous carrier in the ratio of 1 to 1.5 parts by weight carrier to one part by weight total solids, said carrier containing from 0.3 to 1.0 percent methyl cellulose as a binder.

3. A coating slurry for diffusion reaction with a refractory metal comprising an admixture of 45 percent by weight silicon metal powder, 5 percent by weight alkali metal halide and 50 percent by weight of a water solution containing 0.6 percent methyl cellulose.

4. A coating slurry for diffusion reaction with a refractory metal comprising an admixture of 45 percent by weight silicon metal powder, 5 percent by weight sodium fluoride and 50 percent by weight of a water solution containing 0.6 percent methyl cellulose.

5. A coating slurry for diffusion reaction with a refractory metal comprising an admixture of 45 percent by weight silicon metal powder, 5 percent by weight of an alkali metal halide selected from the group consisting of sodium and potassium chlorides, fluorides, bromides and iodides and 50 percent by weight of a water solution containing 0.6 percent methyl cellulose.

References Cited

UNITED STATES PATENTS

| | | |
|---|---|---|
| 2,836,513 | 5/1958 | Samuel. |
| 2,878,554 | 3/1959 | Long _____ 117—22 X |
| 3,037,883 | 6/1962 | Wachtell et al. |
| 3,083,122 | 3/1963 | Weatherley et al. |
| 3,163,553 | 12/1964 | Commanday et al. |
| 3,293,069 | 12/1966 | Bradley et al. _____ 117—107 X |

RALPH S. KENDALL, *Primary Examiner.*

A. G. GOLIAN, *Assistant Examiner.*

U.S. Cl. X.R.

106—1; 117—106, 107.2; 148—6